(12) United States Patent
Harris et al.

(10) Patent No.: US 7,935,660 B2
(45) Date of Patent: *May 3, 2011

(54) PROCESS FOR DISRUPTION OF FILTER CAKES

(75) Inventors: Ralph Edmund Harris, Surrey (GB); Ian Donald McKay, Surrey (GB)

(73) Assignee: Cleansorb Limited, Surrey (GB)

( * ) Notice: Subject to any disclaimer, the term of this patent is extended or adjusted under 35 U.S.C. 154(b) by 1005 days.

This patent is subject to a terminal disclaimer.

(21) Appl. No.: 10/594,394

(22) PCT Filed: Mar. 24, 2005

(86) PCT No.: PCT/GB2005/001193
§ 371 (c)(1),
(2), (4) Date: Nov. 1, 2006

(87) PCT Pub. No.: WO2005/095538
PCT Pub. Date: Oct. 13, 2005

(65) Prior Publication Data
US 2007/0204997 A1    Sep. 6, 2007

(30) Foreign Application Priority Data
Mar. 27, 2004    (GB) .................... 0406998.5

(51) Int. Cl.
*C09K 8/03* (2006.01)
*C09K 8/08* (2006.01)
*C09K 8/12* (2006.01)

(52) U.S. Cl. ........ 507/101; 507/110; 507/111; 507/112; 507/117; 507/118; 507/129; 507/139; 166/305.1

(58) Field of Classification Search .................... None
See application file for complete search history.

(56) References Cited

U.S. PATENT DOCUMENTS

| | | | |
|---|---|---|---|
| 3,974,082 A | 8/1976 | Weyn | |
| 4,175,042 A | 11/1979 | Mondshine | |
| 4,387,769 A * | 6/1983 | Erbstoesser et al. | 507/219 |
| 4,526,695 A * | 7/1985 | Erbstoesser et al. | 507/219 |
| 4,585,482 A | 4/1986 | Tice et al. | 106/15.05 |
| 4,848,467 A | 7/1989 | Cantu | 166/281 |
| 4,957,165 A | 9/1990 | Cantu | 166/295 |
| 4,961,466 A | 10/1990 | Himes | 166/250 |
| 4,986,353 A | 1/1991 | Clark et al. | |
| 4,986,354 A | 1/1991 | Cantu et al. | 166/279 |
| 4,986,355 A | 1/1991 | Casad et al. | |
| 5,108,457 A | 4/1992 | Poulose et al. | |
| 5,201,370 A * | 4/1993 | Tjon-Joe-Pin | 166/300 |
| 5,278,256 A | 1/1994 | Bellis et al. | |
| 5,296,161 A | 3/1994 | Wiersema et al. | |
| 5,325,921 A | 7/1994 | Johnson et al. | 166/280.1 |
| 5,338,474 A | 8/1994 | Kaiserman et al. | |
| 5,352,594 A | 10/1994 | Poulouse | |
| 5,364,554 A | 11/1994 | Stanislowski et al. | |
| 5,439,057 A | 8/1995 | Weaver et al. | 166/295 |
| 5,547,026 A * | 8/1996 | Brannon et al. | 166/295 |
| 5,678,632 A | 10/1997 | Moses et al. | |
| 5,680,900 A | 10/1997 | Nguyen et al. | 166/295 |
| 6,131,661 A * | 10/2000 | Conner et al. | 166/300 |
| 6,140,277 A | 10/2000 | Tibbles et al. | |
| 6,143,698 A * | 11/2000 | Murphey et al. | 507/145 |
| 6,394,185 B1 | 5/2002 | Constien | 166/296 |
| 6,401,819 B1 * | 6/2002 | Harris et al. | 166/300 |
| 6,432,885 B1 | 8/2002 | Vollmer | 507/236 |
| 6,453,545 B1 * | 9/2002 | Hatley et al. | 29/732 |
| 6,599,863 B1 | 7/2003 | Palmer | 507/219 |
| 6,605,570 B2 * | 8/2003 | Miller et al. | 507/211 |
| 6,631,764 B2 * | 10/2003 | Parlar et al. | 166/278 |
| 6,702,023 B1 | 3/2004 | Harris et al. | |
| 6,763,888 B1 * | 7/2004 | Harris et al. | 166/305.1 |
| 6,817,414 B2 | 11/2004 | Lee | 166/278 |
| 7,021,383 B2 * | 4/2006 | Todd et al. | 166/307 |
| 7,195,068 B2 | 3/2007 | Todd | |
| 7,265,079 B2 * | 9/2007 | Willberg et al. | 507/203 |
| 7,482,311 B2 | 1/2009 | Willberg et al. | |
| 2002/0036088 A1 | 3/2002 | Todd | |
| 2002/0076803 A1 * | 6/2002 | Crews | 435/266 |
| 2002/0142919 A1 | 10/2002 | Constien | 507/100 |
| 2004/0094300 A1 * | 5/2004 | Sullivan et al. | 166/308.1 |

(Continued)

FOREIGN PATENT DOCUMENTS

EP    0 404 489 B1    3/1995

(Continued)

OTHER PUBLICATIONS http://chemfinder.cambridgesoft.com/result.asp for sodium chlorite, accessed Oct. 24, 2006.

(Continued)

*Primary Examiner* — John J Figueroa
(74) *Attorney, Agent, or Firm* — Nixon & Vanderhye

(57) ABSTRACT

A process for producing a self-disrupting filter cake in an underground formation, which process comprises: (a) incorporating into a drilling fluid a solid polymer capable of being converted by hydrolysis into one or more organic acids; (b) using the drilling fluid to drill a wellbore into the underground formation such that the solid polymer in the drilling fluid contributes to the formation of a filter cake; and (c) allowing the solid polymer to hydrolyse in the presence of water and to disrupt the integrity of the filter cake. A drilling fluid which contains as a bridging agent one or more solid polymers capable of being converted by hydrolysis into one or more organic acids is also provided.

31 Claims, No Drawings

U.S. PATENT DOCUMENTS

| | | | |
|---|---|---|---|
| 2004/0106525 A1 | 6/2004 | Willberg et al. | |
| 2005/0059556 A1 | 3/2005 | Munoz, Jr. et al. | |
| 2005/0059557 A1 | 3/2005 | Munoz, Jr. et al. | |
| 2006/0016596 A1 | 1/2006 | Pauls et al. | |
| 2006/0105917 A1* | 5/2006 | Munoz | 507/103 |
| 2006/0105918 A1 | 5/2006 | Munoz, Jr. | |
| 2006/0205608 A1 | 9/2006 | Todd | |
| 2006/0229212 A1 | 10/2006 | Willberg et al. | |
| 2007/0078064 A1 | 4/2007 | Munoz, Jr. et al. | |
| 2007/0123433 A1 | 5/2007 | Sarkar et al. | |

FOREIGN PATENT DOCUMENTS

| | | |
|---|---|---|
| WO | 00/57022 A1 | 9/2000 |
| WO | 2004/037946 A1 | 5/2004 |
| WO | WO 2004/037946 A1 | 6/2004 |
| WO | 2005/028587 A2 | 3/2005 |

OTHER PUBLICATIONS

International Search Report for PCT/GB2005/001193 mailed Jun. 16, 2005.

* cited by examiner

PROCESS FOR DISRUPTION OF FILTER CAKES

This application is the US national phase of international application PCT/GB2005/001193 filed 24 Mar. 2005, which designated the U.S. and claimed priority of GB 0406998.5 filed 27 Mar. 2004, the entire contents of each of which are hereby incorporated by reference.

The process of the present invention is generally applicable to the drilling of wells into hydrocarbon and water containing underground formations, from which hydrocarbons or water are subsequently produced.

In conventional drilling of a well into an underground formation a drilling fluid is generally used. Drilling fluids (also referred to as drilling muds or drill-in fluids) are normally formulated to minimise the loss of fluid to the formation. This is commonly achieved by incorporating into the drilling fluid suitable materials, which contribute to the formation of a filter cake. Water-based drilling fluids generally contain bridging and weighting agents, at least one polymer as a viscosifier and a fluid loss additive such as starch. Suitable bridging agents include, but are not limited to, barite, calcium carbonate and dolomite which also function as weighting agents. Sized salt may also be used as a bridging agent in conjunction with a saturated salt solution (U.S. Pat. No. 4,175,042). Generally, one or more bridging agents are used in combination with viscosifying agents such as suitable biopolymers. Together with formation fines generated during the drilling process, this results in the formation of a filter cake on the inside of the wellbore. While the filter cake is being formed, there is a loss of fluid to the formation generally referred to as the fluid spurt loss.

After drilling, the wellbore may be cased and perforated in which case the filter cake is bypassed. However, many wells, particularly horizontal wells and in particular long horizontal wells are left as openhole wells, with no casing and perforation in the production interval. After drilling, such wells have a filter cake lining the inside of the wellbore. The filter cake produced during drilling is a type of formation damage and although desirable during drilling can significantly limit the production rate of hydrocarbon or water from such wells, or limit the injectivity of injector wells. The filter cake must therefore be removed in order to maximise the production or injection rate.

If the formation is a high permeability formation, the filter cake may be adequately removed by a high drawdown. Often however, in low permeability formations or formations with a low drawdown, a process which assists in the removal of the filter cake must be applied in order to ensure that the filter cake is removed. It is generally necessary to apply a chemical treatment to remove the filter cake. Conventional treatments for removing filter cake include the use of aqueous solutions of an oxidiser, hydrochloric acid solutions, organic acid solutions including formic or acetic acid, combinations of acid and oxidiser, and aqueous solutions of enzymes.

There is a particular need for processes that will effectively disrupt filter cakes following gravel packing. Successful gravel packing of open holes ("external gravel packing") requires the presence of an intact filter cake. However, in order to give acceptable production rates, efficient clean up of filter cakes is required or desirable after placing the gravel.

An intact filter cake is also desirable in other types of sand control completions, for example when placing pre-packed screens, to prevent fluid loss. Again efficient disruption of filter cakes is required or desirable following placing of the screen to give acceptable production rates.

U.S. Pat. No. 6,140,277 and PCT/GB00/01032 detail the problems which affect conventional techniques of filter cake removal. The effective placement of reactive fluids such as hydrochloric acid is very difficult and generally results in very variable effectiveness of treatment along the wellbore or other target zone. Placement problems have been addressed by methods which generate acid in-situ (U.S. Pat. No. 5,678,632; PCT/GB00/01032).

Another problem is that filter cakes frequently consist of several components which are generally not removable by a single treatment. For example, certain drilling muds or drill-in fluids contain calcium carbonate or dolomite in combination with a polymer or polymers which provides suitable rheological properties. Both the carbonate and the polymer contribute to the formation of a filter cake. Rock fines generated during drilling of the formation rocks may also be present in the filter cakes.

An acid may be used to dissolve the carbonate components of such filter cakes and suitable polymer breakers such as oxidizing agents or enzymes may be used to break down polymers in the filter cake. These have generally been applied as separate treatments as acids and polymer breakers are frequently incompatible (see U.S. Pat. No. 6,140,277; PCT/GB00/01032).

U.S. Pat. No. 6,140,277 teaches the use of formulations comprising a viscoelastic surfactant, a chelating agent and an enzyme for breaking a filter cake.

PCT/GB00/01032 teaches the use of formulations comprising esters which hydrolyse (optionally using ester hydrolysing enzymes) to produce organic acid in-situ in combination with oxidants or enzyme polymer breakers to treat formation damage including filter cakes.

Both U.S. Pat. No. 6,140,277 and PCT/GB00/01032 allow single stage treatments of filter cakes wherein the treatment dissolves carbonate and hydrolyses polymers. Both types of treatment give very good zonal coverage.

If drilling fluid formulations were available in which the filter cake was substantially degraded within a reasonable period of time (a few days to a few weeks) without using a clean up treatment this would avoid the need for separate well clean up treatments. It would also overcome the problems associated with placing reactive treatment fluids and obtaining good zonal coverage in such treatments. Such filter cakes could be regarded as self cleaning.

It is the object of the present invention to provide drilling fluid formulations that produce filter cakes which are fully or partially self cleaning following drilling. Accordingly, the present invention provides a process for producing a self-disrupting filter cake in an underground formation, which process comprises:

(a) incorporating into a drilling fluid a solid polymer capable of being converted by hydrolysis into one or more organic acids;

(b) using the drilling fluid to drill a wellbore into the underground formation such that the solid polymer in the drilling fluid contributes to the formation of a filter cake; and (c) allowing the solid polymer to hydrolyse in the presence of water and to disrupt the integrity of the filter cake.

In the process of the present invention the drilling fluid (generally referred to as a drill-in fluid) used for drilling through that part of the formation from which hydrocarbons or water will be produced is formulated to give acceptable drilling properties. A fluid used for drilling needs to have properties consistent with its required functions. Required functions of a drilling fluid, drilling mud or drill-in fluid include: control of formation pressure; lubrication of the drill string; cooling of the drill bit; suspension of solids under static conditions and the removal of drilled cuttings from the hole.

In the process of the present invention the composition of the drilling fluid is also formulated to include selected solid polymer materials which act as bridging agents and contribute to the build up of a filter cake.

The drilling fluid is normally a water based fluid but may be oil based or based on synthesised compounds such as liquid esters. Such drilling fluids will be well known to those skilled in the art.

In the most basic embodiment of the invention, particles of a solid polymer that undergoes slow hydrolysis and dissolution at reservoir temperature are selected and incorporated into the drilling fluid used to drill into the hydrocarbon or water producing part of the formation. As the well is drilled, the polymer particles contribute to the production of a filter cake in combination with formation fines, viscosifying agents including biopolymers if present, and other particulate materials incorporated into the drilling fluid as a bridging, or fluid loss agent. Drilling using the process of the present invention includes all processes that would be recognised as drilling by one skilled in the art, including under-reaming. Subsequently the polymer hydrolyses in the presence of water to water-soluble monomers or oligomers. Normally the polymer will dissolve to produce organic acid or acids. Hydrolysis of the polymer disrupts the integrity of the filter cake by removing at least a portion of the particulate material in the filter cake. In addition, if the filter cake contains acid soluble material, such as a carbonate bridging agent and/or formation fines, acid produced by hydrolysis of the polymer will react with at least a portion of the acid soluble material and will further disrupt the integrity of the filter cake. If the formation is a carbonate formation, acid produced by the hydrolysis of the polymer may also react with the formation adjacent to the filter cake and will assist in disruption of the filter cake.

The hydrolysis of the solid polymer normally occurs over a period longer than that needed to drill through that part of the formation which will be produced. Normally this will be at least a few days and preferably 4 or more days, although hydrolysis of the polymer over a shorter or longer period may be desirable depending on the time taken to drill and complete the well. Generally it is desirable that the filter cake should remain intact until drilling is complete. At this point the drilling fluid is usually displaced to a solids free fluid, normally an aqueous fluid. It is desirable that the integrity of the filter cake is disrupted only substantially after the drilling fluid has been displaced to a solids free fluid, so that fluid loss to the formation will be minimised.

The polymer used in the process of the present invention is any solid polymer which hydrolyses in the presence of water to generate an organic acid or acids. Preferably the polymer is a polyester, typically an aliphatic polyester. Most preferably the polyester is selected from the group which can be synthesised by suitable processes known to those skilled in the art, including the ring opening melt condensation of lactide (lactic acid cyclic dimer), glycolide (glycolic acid cyclic dimer) and caprolactone. Suitable polymers include polymers which incorporate lactide, glycolide or caprolactone, with or without other monomers. Specific examples include polylactide (polylactic acid), polyglycolide (polyglycolic acid), lactide-glycolide copolymer, lactide-caprolactone copolymer, glycolide-caprolactone copolymer and lactide-glycolide-caprolactone copolymer. Suitable polymers also include homopolymers or copolymers of lactic acid and hydroxyacetic acid (glycolic acid) and copolymers of lactic acid and/or glycolic acid with one or more other compounds containing hydroxy-, carboxylic- or hydroxycarboxylic acid moieties. U.S. Pat. No. 4,986,353 provides examples of suitable monomers with which lactic acid or glycolic acid may be condensed. Suitable monomers include but are not limited to tribasic acids such as citric acid, dibasic acids such as adipic acid, and diols such as ethylene glycol and polyols. They also include difunctional molecules such as 2,2-(bishydroxymethyl)propanoic acid. Preferred co-condensing molecules according to the process of U.S. Pat. No. 4,986,353 are citric acid, 2,2-(bishydroxymethyl) propanoic acid, trimethylolethane, and adipic acid.

These, or any other monomers may also be incorporated into the polymers according to the process of the present invention as long as the solid polymer undergoes hydrolysis in the presence of water to generate an organic acid or acids. Acid production is from simple hydrolysis of ester linkages in the polyester.

Polymers which hydrolyse to produce lactic acid and/or glycolic acid are preferred. Particularly preferred polymers are aliphatic polyesters selected from the group which can be synthesised by the condensation of lactic acid, glycolic acid, lactide (dimer of lactic acid) glycolide (dimer of glycolic acid) and caprolactone. Hydrolysis of a polymer wherein lactic acid has been incorporated by condensation produces lactic acid and hydrolysis of a polymer wherein glycolic acid has been incorporated by condensation produces glycolic acid.

The composition of the polymer or copolymer is a principal determinant of the hydrolysis rate of the polymer. A composition which will give the required rate of hydrolysis under the temperature conditions of the treated formation will generally be selected. After drilling of the well and displacement of the drilling fluid to a solids free fluid, the well will normally be shut in for a time sufficient for the polymer to hydrolyse and disrupt the integrity of the filter cake. The well is then put on production (or in the case of an injector well on injection).

Hydrolysis of the polymer is by bulk erosion (Biodegradable Polymers as Drug Delivery Systems, Edited by Mark Chasin and Robert Langer. Marcel Dekker Inc., New York, Basel and Hong Kong, 1990).

The rate of hydrolysis is primarily influenced by four key variables; monomer stereochemistry (D or L form), comonomer ratio, polymer chain linearity and polymer molecular weight. Hydrolysis takes place at the surface of the polymer so, for a given polymer composition, the particle size of the polymer is also a prime determinant of the rate of hydrolysis and acid production.

Smaller particles of a polymer of a given composition at a given temperature have a larger surface area per unit weight so will produce acid at a faster rate. In general, polylactic acid and other lactic acid rich polymers will degrade at a slower rate than polyglycolic acid and glycolic acid rich polymers and are generally preferred for the process of the present invention.

Incorporation of caprolactone into the polymers can increase the rate of hydrolysis of the polymers if desired. The rate of hydrolysis of the polymers may also be influenced by the extent of block or random structure in copolymers, by chemical modification of the end groups of the polymer or by the introduction of branching into the polymers, for example by incorporating polyols into the polymer The rate of depolymerisation may also be increased by incorporating specific chemicals such as quaternary ammonium compounds into the polyesters (U.S. Pat. No. 5,278, 256).

Compositions of polymer which hydrolyse relatively quickly include polyglycolic acid and polymers where glycolic acid represents over 50% to 100% of the constituent monomers of the polymer. Compositions of polymer which hydrolyse relatively slowly include polylactic acid and polymers where lactic acid represents over 50% to 100% of the constituent monomers of the polymer. In low temperatures, for example from 20° C. to 100° C., polymers rich in glycolic acid (i.e. containing over 50%) will tend to be used in the process of the present invention. At higher temperatures, for example from about 80° to 170° C. polymers rich in lactic acid (i.e. containing over 50%) will tend to be used.

The type of organic acid, amount of acid delivered and rate of acid production at a given temperature may be determined by selecting an appropriate polymer composition and form of presentation of the solid polymer (size and shape of the solids).

Acid produced by the hydrolysis of the polymer may react with acid soluble material such as calcium carbonate or dolomite present in the filter cake or adjacent formation. Preferably, the organic acids produced by the hydrolysis of the polymer react with calcium carbonate to form calcium salts with a solubility in water of at least a few percent at the formation temperature. Lactic acid and glycolic acid are suitable acids.

Because acid is produced over a period of time, the solid polymer may be incorporated into the filter cake before most of the acid is produced. The polymer will normally be present in the whole of the drilling fluid used to drill through the production interval and will therefore be present in the whole of the filter cake.

The polymers may be used in any solid configuration, including, but not being limited to spheres, cylinders, cuboids, fibres, powders, beads or any other configuration which can be introduced into the formation. It will preferably be used in the form of particles in the size range 1 micron to 2 mm, most preferably 5 microns to 100 microns.

Polymers of the desired size and shape may be prepared by any suitable process known to those skilled in the art including but not being limited to high shear dispersion of the polymer melt, emulsification followed by solvent evaporation, desolvation, spray drying or grinding. Some suitable processes of producing microparticles, microspheres, microcapsules, shaped particles and fibres are reviewed in Chasin, M and Langer, R. (Eds.). Biodegradable Polymers as Drug Delivery Systems. Marcel Dekker Inc., New York, (1990). U.S. Pat. No. 4,986,355 teaches a process of preparing suitably sized polyester particles for use as a fluid loss additive or as a gel breaker in a subterranean formation.

In general it is desirable to avoid the use of chlorinated solvents in solvent based methods of producing the particles of the desired size and shape. For example methylene chloride has been used to produce micro-particles of polyesters such as polylactide for use in drug delivery applications, but significant amounts of methylene chloride may be present in the micro-particles even after drying. The presence of chlorinated solvents will reduce the otherwise excellent environmental acceptability of the polyesters. The solubility of polyesters in non-chlorinated solvents is generally limited.

In other embodiments of the invention, polymer breakers may also, optionally, be introduced into the wellbore to assist in the disruption of the filter cake, by attacking any biopolymers or other viscosifying or fluid loss polymers present in the filter cake. The polymer breaker may be introduced into the drilling fluid and/or into the solid polymer itself but will preferably be introduced into the solids free fluid introduced into the wellbore to displace the drilling fluid. The polymer breakers may be dissolved or dispersed in the drilling fluid, solid polymer or solids free fluid or may be present in the form of any delayed or controlled release formulation, including encapsulated forms of the polymer breakers, such as will be known by those skilled in the art.

Preferred polymer breakers of the present invention are oxidative breakers (oxidants) and enzyme breakers, although any other breaker capable of at least partly degrading viscosifying or fluid loss polymers may also be used.

Oxidative breakers used in the process of the present invention may be any one of those oxidative breakers known by those skilled in the art to be useful to react with viscosifying or fluid loss polymers, in most cases polysaccharide biopolymers, to reduce the viscosity of polymer containing compositions or to disrupt polymer containing filter cakes. The oxidative breaker may be present in solution or as a dispersion. Suitable compounds include peroxides, persulphates, perborates, percarbonates, perphosphates, hypochlorites, persilicates and hydrogen peroxide adducts such as urea hydrogen peroxide and magnesium peroxide. They will generally be used at least at that concentration known to be effective by those skilled in the art.

Preferred oxidative breakers for incorporation into the drilling fluid, the fluids (including solids free fluids) introduced into the wellbore to displace the drilling fluid, or into the solid polymer according to the method of the present invention are peroxides which can decompose to generate hydrogen peroxide. Of the oxidative breakers most preferred are percarbonates and perborates, most especially sodium percarbonate and sodium perborate.

Preferred enzyme breakers for use in the process of the present invention include those enzymes known in the art to be useful to hydrolyse viscosifying or fluid loss polymers and thereby to reduce the viscosity of polymer containing compositions or to disrupt polymer containing filter cakes. Enzyme breakers will be selected on the basis of their known ability to hydrolyse the viscosifying polymer. Normally the viscosifying polymer will be a polysaccharide and the enzyme breakers will be selected on the basis of their known ability to hydrolyse polysaccharide components in the filter cake. Examples of suitable enzymes which may be used to break polysaccharides include enzymes which can hydrolyse starch, xanthan, cellulose, guar, scleroglucan, succinoglycan or derivatives of these polymers.

In some embodiments of the present invention the effectiveness of the incorporated oxidant breakers can be enhanced by producing more reactive oxidants. Under certain conditions, for instance when a peroxide is introduced, the production of hydrogen peroxide in the presence of the organic acid may result in the formation of a peracid which is a more effective oxidant than the hydrogen peroxide. Hydrolysis of esters in the presence of hydrogen peroxide may also result in the production of peracids. Esters are known to be hydrolysed by hydrolases (EC 3) such as a lipase (EC 3.1.1.3), an esterase (EC 3.1.1.1) or a protease (EC 3.4) in the presence of hydrogen peroxide or other peroxides to form a peracid (U.S. Pat. No. 3,974,082; U.S. Pat. No. 5,108,457; U.S. Pat. No. 5,296,161; U.S. Pat. No. 5,338,474; U.S. Pat. No. 5,352,594; U.S. Pat. No. 5,364,554). Peracids produced in-situ by such enzymes have been used for bleaching applications. Peracids are more effective oxidants than peroxides, particularly in the temperature range 25 to 80° C. Accordingly, esters, ester hydrolyzing enzymes, hydrogen peroxide or hydrogen peroxide generating compounds may be incorporated into the drilling fluid, into the solids free fluid introduced into the wellbore to displace the drilling fluid, or into the solid polymer of the present invention. Hydrolysis of polyesters in the presence of hydrogen peroxide is also expected to generate peracids.

In certain embodiments of the present invention, it may be desirable to use more than one type of polymer breaker, for example an oxidant might be used in combination with an enzyme breaker in the case where two polysaccharides are present but only one is amenable to attack by an enzyme.

The solid polymers may if desired contain other materials by dissolution, dispersion or encapsulation. The other materials may include polymer breakers. Hydrolysis of the solid polymer will release the polymer breakers or other added materials. In the case of polymer breakers encapsulated in the polymer, release will generally follow hydrolysis of the solid polymer and acid production and in the case of dissolved or dispersed materials, release will be coincident with acid production. One function of the added materials is to adjust the specific gravity of the solid polymer to the desired value for incorporation in the drilling fluid. Preferred materials for adjusting the specific gravity include water-soluble alkali metal salts and other salts such as are otherwise used for adjusting the specific gravity of oilfield brines. The other materials may also comprise calcium peroxide and ammonium bifluoride. Where the other materials are water soluble, dissolution of the water soluble other material coincident with hydrolysis of the solid polymer will occur in the presence of a brine that is under-saturated with respect to the water soluble material. This will result in further disruption of the filter cake.

Because acid is produced by the hydrolysis of the solid polymers, chemicals which react with acid to produce desirable oxidants or other chemicals for treatment of the underground formation may conveniently be incorporated into one or more of the drilling fluid, the fluid introduced into the wellbore to displace the drilling fluid or into the solid polymer according to the method of the present invention. Examples of suitable chemicals are calcium peroxide and ammonium bifluoride. Calcium peroxide decomposes in the presence of acid to form hydrogen peroxide and ammonium bifluoride decomposes in the presence of acid to form hydrogen fluoride. In-situ production of hydrogen peroxide or hydrogen fluoride can further assist in disruption of the filter cake. Production of hydrogen fluoride permits the dissolution of materials which are not readily soluble in organic acids solutions such as silicate or clay fines produced by the drilling process, silicate or clays present in the drilling mud (e.g. bentonite or montmorillonite) or silicate or clays present in the formation, for example a sandstone formation, adjacent to the wellbore. Generation of hydrogen fluoride in the process of the present invention may assist in disruption of filter cakes that contain materials dissolvable by hydrogen fluoride or disruption of filter cakes which are adjacent to formations that contain materials dissolvable by hydrogen fluoride.

Glycolic acid can dissolve calcium sulphate. Glycolic acid produced by hydrolysis of the solid polymer, or introduced directly into the wellbore, can efficiently remove calcium sulphate thus allowing calcium sulphate to be used as a bridging agent in the drilling fluid if desired. Glycolic acid produced by hydrolysis of solid polymer may also be effective in dissolving any calcium sulphate produced by reaction between the drilling fluid and formation fluid. Other chelating acids which may be produced by hydrolysis of solid polymer and which may dissolve other mineral bridging agents or scales will be evident to those skilled in the art.

More than one solid polymer with or without encapsulated, dissolved or dispersed polymer breakers may be introduced into the formation at the same time. The eventual complete dissolution of the solid polymers allows ideal clean up behaviour.

All chemicals required for the process of the present invention will normally be technical grade to reduce the cost of the process.

Where an enzyme is used as a polymer breaker according to the process of the present invention, it is necessary to select an enzyme which remains active under reservoir conditions and in the treatment fluid for at least as long as the catalytic activity is needed.

The enzyme is generally a water-soluble enzyme. It is generally advantageous for the enzymes to be readily water-soluble although the enzymes may also be active and be used in low water activity environments or two-phase systems such as emulsions or dispersions. Typically, isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess the desired catalytic ability. Preferably, the enzymes will be industrial enzymes available in bulk from commercial sources.

Although most of the acid is produced from hydrolysis of the solid polymer after the filtercake is formed, traces of acid present in the drilling fluid which arises from hydrolysis of the solid polymers during drilling, could potentially lead to premature dissolution of acid soluble portions of the filter-cake. This situation can be avoided by incorporation into drilling fluids of the present invention of a suitable amount of a base or a buffer which would maintain the pH at a level above that at which erosion of the filter cake would occur for at least the period of time required to drill the wellbore in the hydrocarbon or water bearing formation.

Similarly, premature dissolution of filter cake due to polymer breakers attacking the filter cake may be addressed by using controlled release preparations of polymer breaker such as will be known to those skilled in the art, including, but not being limited to, preparations wherein the polymer breaker is incorporated into the solid polymer by encapsulation, dissolution or dispersion. Normally however, the polymer breakers will not be present in the drilling fluid as they would otherwise reduce the viscosity to below the desired value. Preferably, one or more polymer breakers will be introduced into the wellbore in the solids free fluid which is used to displace the drilling fluid. The polymer breaker will be present in an amount sufficient to assist in the further disruption of filter cake due to degradation of polymers present in the filter cake. This disruption is in addition to that caused by dissolution of solid polymer and dissolution of any acid soluble material present in the filter cake.

Disruption of a filter cake according to the process of the present invention may optionally be used in combination with conventional filter cake disrupting agents other than polymer breakers. These are well known to those skilled in the art including acids, acid generating combinations such as esters and ester hydrolysing enzymes, and chelating agents. The components of such chemical treatments may conveniently be included in the fluids used to displace the drilling fluid from the wellbore.

The drilling fluid and solids free fluid used to displace the drilling fluid may be prepared by any method of preparing such fluids which is well known to those skilled in the art. The fluids will normally only be used to drill through the production interval. Other drilling fluids will be used to drill through other zones.

The present invention further provides a drilling fluid suitable for drilling into an underground formation which contains as a bridging agent one or more solid polymers capable of being converted by hydrolysis into one or more organic acids. The or each solid polymer may be as defined above in connection with the process of the invention. Preferably the solid polymer is a polyester.

The amounts of solid polymer present in the drilling fluid will depend on the required characteristic of the drilling fluid and the amounts of the other components of the drilling fluid. Generally, the formulation chosen will result in a filter cake which contains sufficient of the solid polymer such that when the solid polymer hydrolyses, it will cause sufficient disruption of the filter cake (alone or in combination with the dissolution of acid soluble material in the filter cake and/or degradation of polymers in the filter cake if polymer breakers are already present) to increase and preferably to substantially restore the formation permeability to that which existed before drilling the well.

Typically a volume of solid polymer will be used which will replace all or part of the volume of particulate material typically present in a drilling fluid. Typically, up to about 60% by weight of solids is present in a drilling fluid, which may be up to about 20% by volume. Accordingly, between about 1% and 25% and preferably about 5 to 20% by volume of solid polymer may be incorporated into drilling fluids according to the method of the present invention.

Where polymer breakers are incorporated into fluids according to the method of the present invention, they will be incorporated at a concentration sufficient to contribute to the disruption of the filter cake. Enzyme polymer breakers will typically be used at 0.05% to 5% v/v commercial liquid preparations or the equivalent amount of dry enzyme preparation. Amounts of oxidative polymer breaker used will depend on the type of breaker employed but will be of the order of 0.005 to 60 Kg/m3, preferably 0.2 to 10 Kg/m3. If polymer breakers are incorporated into solid polymer they will also be incorporated at a concentration sufficient to contribute to the disruption of the filter cake.

Generally the drilling fluid and the solids free fluid used to displace the drilling fluid will be aqueous. The solid polymer may however be incorporated into hydrocarbon based drilling fluids. Dissolution of filter cake requires the presence of water. In displacing from a hydrocarbon based fluid to a water based fluid care will need to be taken to avoid the formation of emulsions. Potential problems in performing the fluid displacement operations and methods of overcoming these problems will be well known to those skilled in the art.

The present invention has the following particular advantages over the prior art:

Drilling using drilling fluid formulations of the present invention produces a filter cake which is self cleaning. The drilling fluid formulations are low hazard. The process disrupts filter cakes along the whole of the production interval with good zonal coverage. The use of conventional acid based clean up methods is not required which has operational and health and safety advantages. Filter cake containing both carbonate and polymers may be simply and conveniently disrupted by drilling a well with drilling fluid formulations of the present invention and displacing to a so lids free fluid containing polymer breakers. Disruption of filter cake following gravel packs and other sand control completions can be achieved without incorporating treatment chemicals into the gravel packing fluid or a subsequent treatment of the gravel packed well. The components of the system are generally environmentally acceptable. The fluids used to remove the filter cake are not highly corrosive. The use of corrosion inhibitors is therefore not generally required which gives additional environmental benefits.

The invention will be further illustrated by the following examples:

EXAMPLE 1

1 g of polyglycolic acid powder was added to 50 ml tubes containing 10 ml of water and 2 g of calcium carbonate (average particle size 50 microns). The tubes were capped and incubated at 25° C., 60° C. and 80° C. Calcium carbonate dissolution (due to glycolic acid liberated by hydrolysis of the polyglycolic acid) was monitored by taking samples of the aqueous fluid, separating particulate material by centrifugation and analyzing the soluble calcium using a colorimetric assay method.

The amount of calcium carbonate dissolved after 24 hours was 6, 20 and 40 g/l at 25° C., 60° C. and 80° C. respectively.

EXAMPLE 2

1 g of polylactic acid granules (average 2.5 mm diameter) was added to 50 ml tubes containing 10 ml of water and 2 g of calcium carbonate (average particle size 50 microns). The tubes were capped and incubated at 80° C. and 95° C. Calcium carbonate dissolution (due to lactic acid liberated by hydrolysis of the polylactic acid) was monitored by taking samples of the aqueous fluid, separating particulate material by centrifugation and analyzing the soluble calcium using a colorimetric assay process.

The amount of calcium carbonate dissolved after 24 hours was 2.5 and 12.4 g/l at 80° C. and 95° C. respectively.

EXAMPLE 3

1.000 g of ground polylactic acid (average diameter 400 microns) was added to 75 ml of deionised water at placed in an Ofite high pressure high temperature (HPHT) cell. The cell was sealed and heated to 121 degrees C. After approximately 23 hours, 48 hours or 69 hours (three separate runs) the cell was opened and any un-dissolved material collected and air-dried to constant weight. The percentage of the initial PLA dissolved was then determined.

| Time at 121° C. (hours) | Percent PLA dissolved | pH of solution (by pH indicator strip) |
| --- | --- | --- |
| 0 | 0 | |
| 23 | 60 | 3 |
| 48 | 98 | 2* |
| 69 | 100 | 2 |

(*2.85 by pH meter)

These results indicate that hydrolysis requires tens of hours at 121 degrees C. The low pH indicates that production of lactic acid is associated with the hydrolysis of the polylactic acid.

The Examples show that polyglycolic acid and polylactic acid hydrolyse in contact with water. Calcium carbonate is dissolved by acid produced from the hydrolysis of the solid polymers. They farther show that the rate of acid production is a function of the composition of the polymer and the temperature. Hydrolysis of polyester polymers present in a filter cake will lead to disruption of the filter cake. The associated organic acid production will further assist in the disruption of carbonate containing filter cakes and filter cakes in contact with a carbonate formation.

The invention claimed is:

1. A process for disrupting a filter cake in an underground formation, which process comprises:
   (a) incorporating into a drilling fluid (i) a solid polymer capable of being converted by hydrolysis into one or more organic acids, and (ii) a viscosifying agent;
   (b) using the drilling fluid to drill a wellbore into the underground formation such that the solid polymer in the drilling fluid contributes to the formation of a filter cake;
   (c) displacing the drilling fluid with a fluid comprising one or more polymer breakers; and
   (d) allowing the solid polymer to hydrolyse in the presence of water and the polymer breaker to disrupt the integrity of the filter cake.

2. A process according to claim 1 wherein the solid polymer is a polyester.

3. A process according to claim 1 wherein the solid polymer is an aliphatic polyester.

4. A process according to claim 1 wherein the solid polymer is a polymer which comprises one or more of lactic acid, lactide, glycolic acid, glycolide, caprolactone and (optionally) other hydroxy, carboxylic acid or hydroxycarboxylic acid compounds which may condense with lactic acid, lactide, glycolic acid, glycolide or caprolactone.

5. A process according to claim 1 wherein the solid polymer is a polymer which produces one or more organic acids on hydrolysis.

6. A process according to claim 1 wherein the solid polymer is a polymer which produces lactic acid or glycolic acid on hydrolysis.

7. A process according to claim 1 wherein the solid polymer is in the form of a sphere, cylinder, cuboid, fibre, powder or bead, or other configuration.

8. A process according to claim 1 wherein the acid produced by hydrolysis of the solid polymer dissolves acid soluble material present in the filter cake or adjacent formation.

9. A process according to claim 1 wherein the drilling fluid comprises the solid polymer in an amount of from 1 to 25% v/v.

10. A process according to claim 1 wherein the drilling fluid further comprises a polymer breaker or the solid polymer further comprises a polymer breaker.

11. A process according to claim 10 wherein the polymer breaker is a hydrolase enzyme.

12. A process according to claim 10 wherein the polymer breaker is a polysaccharide hydrolysing enzyme.

13. A process according to claim 10 wherein the polymer breaker is an enzyme which can hydrolyse starch, xanthan, cellulose, guar, scleroglucan or succinoglycan or a derivative of any one of these polymers.

14. A process according to claim 10 wherein the polymer breaker is in the form of a delayed release preparation.

15. A process according to claim 10 wherein the or each polymer breaker is incorporated into the solid polymer by (a) encapsulation, to allow its or their controlled release coincident with or after acid production; or (b) dissolution or dispersion, to allow its or their controlled release coincident with acid production.

16. A process according to claim 10 wherein the drilling fluid further comprises calcium sulphate as a bridging agent.

17. A process according to claim 10 wherein the polymer breaker is present in an amount sufficient to further disrupt the integrity of the filter cake.

18. A process according to claim 1 wherein the underground formation contains hydrocarbon or water and wherein the process further comprises recovering a hydrocarbon or water from the treated formation.

19. A process according to claim 1 wherein the solid polymer further comprises one or more other materials incorporated into the solid polymer by dissolution dispersion or encapsulation.

20. A process according to claim 19 wherein the one or more other materials are selected from polymer breakers, specific gravity adjusting materials, calcium peroxide and ammonium bifluoride.

21. A process according to claim 1 wherein the drilling fluid is water-based, oil-based, hydrocarbon-based or liquid ester-based.

22. A process according to claim 1 wherein the process further comprises displacing the drilling fluid with a fluid comprising a conventional filter cake disrupting agent other than a polymer breaker.

23. A process according to claim 22 wherein the conventional filter cake disrupting agent is selected from acids, combinations of esters and ester hydrolysing enzymes, and chelating agents.

24. A process according to claim 22 or 23 wherein the fluid used to displace the drilling fluid is an aqueous fluid.

25. A process according to claim 1 which further comprises using one or more conventional filter cake disrupting agents other than polymer breakers.

26. A process according to claim 25 wherein the or each conventional filter cake disrupting agent is selected from acids, combinations of esters and ester hydrolysing enzymes, and chelating agents.

27. A process according to claim 25 wherein the or each conventional filter cake disrupting agent is included in the fluid used to displace the drilling fluid.

28. A process for disrupting a filter cake in an underground formation, which process comprises:
   (a) incorporating into a drilling fluid (i) a solid polymer capable of being converted by hydrolysis into one or more organic acids, and (ii) a viscosifying agent;
   (b) using the drilling fluid to drill a wellbore into the underground formation such that the solid polymer in the drilling fluid contributes to the formation of a filter cake;
   (c) allowing the solid polymer to hydrolyse in the presence of water and to disrupt the integrity of the filter cake; and
   (d) displacing the drilling fluid with a fluid comprising a polymer breaker;
   and wherein the process further comprises displacing the drilling fluid with a fluid comprising a conventional filter cake disrupting agent other than a polymer breaker.

29. A process according to claim 28 wherein the drilling fluid is water-based, oil based, hydrocarbon-based or liquid ester-based.

30. A process according to claim 28 wherein the conventional filter cake disrupting agent is selected from acids, combinations of esters and ester hydrolysing enzymes, and chelating agents.

31. A process according to claim 28 wherein the fluid used to displace the drilling fluid is an aqueous fluid.

* * * * *